(12) United States Patent
Le Buhan et al.

(10) Patent No.: US 10,375,040 B2
(45) Date of Patent: *Aug. 6, 2019

(54) UTILITY METER FOR METERING A UTILITY CONSUMPTION AND OPTIMIZING UPSTREAM COMMUNICATIONS AND METHOD FOR MANAGING THESE COMMUNICATIONS

(71) Applicant: NAGRAVISION S.A., Cheseaux-sur-Lausanne (CH)

(72) Inventors: Corinne Le Buhan, Les Paccots (CH); Christophe Nicolas, Saint-Prex (CH); Joel Conus, Essertines-sur-Yverdon (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,655

(22) Filed: Jan. 24, 2019

(65) Prior Publication Data

US 2019/0173857 A1    Jun. 6, 2019

Related U.S. Application Data

(63) Continuation of application No. 15/498,107, filed on Apr. 26, 2017, now Pat. No. 10,250,575, which is a
(Continued)

(30) Foreign Application Priority Data

Apr. 27, 2011    (EP) .................................. 11163844

(51) Int. Cl.
*G01D 4/00*    (2006.01)
*H04L 29/06*    (2006.01)
(Continued)

(52) U.S. Cl.
CPC ......... *H04L 63/0435* (2013.01); *G01D 4/002* (2013.01); *H04L 9/0618* (2013.01);
(Continued)

(58) Field of Classification Search
CPC combination set(s) only.
See application file for complete search history.

(56) References Cited

U.S. PATENT DOCUMENTS 6,895,502 B1    5/2005 Fraser
7,434,052 B1    10/2008 Rump
(Continued)

FOREIGN PATENT DOCUMENTS

CN         1780361        5/2006
WO    WO 2010/057631    5/2010

OTHER PUBLICATIONS

International Search Report issued in International Application No. PCT/EP2012/050786, dated May 24, 2012.
(Continued)

*Primary Examiner* — Nabil H Syed
*Assistant Examiner* — Cal J Eustaquio
(74) *Attorney, Agent, or Firm* — Oblon, McClelland, Maier & Neustadt, L.L.P.

(57) ABSTRACT

A utility meter and method for metering consumption of at least one utility including: a metering unit, a communication unit for sending/receiving messages to/from a management center, a memory to store a unique identifier pertaining to the utility meter and a first key, an encryption unit for encrypting the utility consumption as a first cryptogram, a message generator for generating a utility message containing the first cryptogram, a key generator for generating a payload key to be used by the encryption unit for encrypting the utility consumption, a second cryptogram generated by the encryption unit by encrypting the payload key with the first key, the
(Continued)

second cryptogram being intended to be included, by the message generator, at least once into the utility message to be sent to the remote management center.

19 Claims, 4 Drawing Sheets

Related U.S. Application Data continuation of application No. 13/983,286, filed as application No. PCT/EP2012/050786 on Jan. 19, 2012, now Pat. No. 9,664,531.

(60) Provisional application No. 61/438,665, filed on Feb. 2, 2011.

(51) Int. Cl.
    *H04L 9/30*     (2006.01)
    *H04Q 9/00*     (2006.01)
    *H04L 9/32*     (2006.01)
    *H04L 9/06*     (2006.01)
    *H04L 9/14*     (2006.01)
    *H04L 9/08*     (2006.01)

(52) U.S. Cl.
    CPC .............. *H04L 9/0861* (2013.01); *H04L 9/14* (2013.01); *H04L 9/30* (2013.01); *H04L 9/3247* (2013.01); *H04Q 9/00* (2013.01); *H04Q 2209/60* (2013.01); *Y02B 90/241* (2013.01); *Y04S 20/32* (2013.01)

(56) References Cited

U.S. PATENT DOCUMENTS

| | | |
|---|---|---|
| 7,697,686 B2 | 4/2010 | Puiatti et al. |
| 2003/0128134 A1 | 7/2003 | Fierro et al. |
| 2005/0065743 A1 | 3/2005 | Cumming et al. |
| 2006/0109982 A1 | 5/2006 | Puiatti et al. |
| 2006/0206433 A1 | 9/2006 | Scoggins |
| 2006/0271244 A1 | 11/2006 | Cumming et al. |
| 2008/0117076 A1 | 5/2008 | Klaus et al. |
| 2008/0153521 A1 | 6/2008 | Benaouda et al. |
| 2009/0201129 A1 | 8/2009 | Lane |
| 2010/0013595 A1 | 1/2010 | De La Torre-Bueno |
| 2011/0004764 A1 | 1/2011 | Stuber |
| 2011/0224935 A1 | 9/2011 | Hampel et al. |

OTHER PUBLICATIONS

Written Opinion issued in International Application No. PCT/EP2012/050786, dated May 24, 2012.
English Language Abstract of CN 1780361 published May 31, 2006.
File History of U.S. Appl. No. 13/983,286.

UTILITY METER FOR METERING A UTILITY CONSUMPTION AND OPTIMIZING UPSTREAM COMMUNICATIONS AND METHOD FOR MANAGING THESE COMMUNICATIONS

CROSS-REFERENCE TO RELATED APPLICATIONS

This application is a Continuation of Ser. No. 15/498,107 filed on Apr. 26, 2017, which is a Continuation of Ser. No. 13/983,286 filed on Aug. 1, 2013, now U.S. Pat. No. 9,664,531, issued on May 30, 2017, which is a U.S. National Stage Application of International Application No. PCT/EP2012/050786 filed Jan. 19, 2012, which claims priority from U.S. Provisional Patent Application No. 61/438,665 filed Feb. 2, 2011 and European Patent Application No. 11163844.1 filed Apr. 27, 2011. The entirety of all the above-listed applications are incorporated herein by reference.

INTRODUCTION

This invention concerns the field of utility meters that are monitored and managed from at least one utility management center through a communication network of a metering system.

BACKGROUND

The on-going deregulation in worldwide energy distribution markets is driving the need for smart utility distribution grids and smart meters, enabling both utility providers and consumers to monitor the detailed consumption of an end user at any time through open communication networks or unreliable networks such as internet. The energy market is particularly concerned as of today but related issues are also relevant to other utility markets such as water or gas.

Automated meters enable utility providers to remotely read the meter registers that record on a regular basis the user consumption information. However, this reading only occurs from time to time at the discretion of the utility provider and typically uses a private network (wireless or cable) under close control by the utility provider. The next generation of automated meters (so called smart meters) will enable utility providers, such as remote utility management center, to monitor the detailed consumption of an end user at any time and at a much finer granularity through open communication networks. This finer grain monitoring is expected to encourage more precisely targeted rates and offerings to the end user, possibly by competing utility providers, as the utility markets get deregulated similar to the telecommunications markets in the 90s. It will become even more relevant when HAN (Home Appliances Networks) are interconnected with the smart grid to directly report on their end usage information rather than concentrating this information reporting through the smart meter.

The utility provider can also remotely manage, configure and upgrade the meter through the communication network. In certain markets, smart meters are even required to implement a remote disconnect feature, so that the utility can remotely stop the service distribution for instance in the case of non-payment.

Consequently, a smart meter typically generates, or passes through in the HAN interconnection case, automated reading messages upstream to the remote utility provider management equipment at a much more frequent rate than former automated meters did. Those messages also possibly carry significantly longer payload as more details are monitored by the utility provider.

Clearly, the resulting dependency of the utility service and billing functionality on remote communication messages raises new concerns on data privacy and confidentiality as well the effective system robustness to software bugs and emerging threats such as smart grid worms and viruses taking advantage of smart meter security design flaws. Those flaws may not be known at the time of deployment, but may become critical later. This is particularly evident in the case of the remote disconnect feature, as a major disruption target for cyber-terrorism but also a possible entry point for local thieves as a way to disconnect some house alarms from their power source.

In practice, today's security designs for smart grids and smart meters are largely inspired by the telecommunication industry and a large part of them is subject to emerging standardization by international committees such as ANSI or IEC. Sensitive messages need to be protected by a secure authenticated channel to be established using cryptographic protocols over an individual point-to-point communication between the utility meter and the remote utility provider management equipment. Therefore, recent standard specifications in that area, such as ANSI C12.22 or IEC 62056/COSEM, define how to encrypt and sign the message payloads, typically by means of a session key setup between the utility management center or data collection concentrator and the utility meter.

As described in the "OpenWay by Itron Security Overview" White Paper from Itron, for practical, operational reasons, some of the downstream messages from the utility management center or collector concentrator may be broadcast or multicast into the utility grid network without a secure receipt acknowledgement from each target utility meter, typically because of the overhead in managing the corresponding upstream messages in a large scale metering deployment (for instance 10 million meters). However the individual meter utility usage consumption information, such as actual utility usage or event logs, have to be communicated back point-to-point from the utility meter to the utility management center or collector concentrator. Therefore, to scale their smart metering system to support up to 10 million meters, Itron reports the need for processing up to 24000 messages per second upstream, while broadcast/multicast downstream messaging enables to factorize the messages down to 200 per second.

In practice, the scalability issue will become even more critical as the smart grid becomes more widely deployed and deregulated because of three major independent factors:

Deregulation enabling the end user to choose between several utility providers service concurrent offerings from a single utility meter, possibly on the fly. In that scenario the utility meter will need to communicate upstream with several utility management centers or collector concentrators, thus basically multiplying the number of upstream messages by the number of utility providers.

The need to systematically enforce the utility meter security messaging and improve the internal utility meter security implementation to prevent cyber-terrorist smart grid attack risks as well as end user meter hacking fraud incentive. The highly sensitive utility meter cryptographic module therefore needs to operate as deeply as possible into the meter system design, typically down to the utility meter data and key registers, rather than at the communication network interface, thus requiring additional cryptographic protocols and messaging mechanisms in addition to the current standard specifications.

The document US 2006/0271244 discloses an energy monitoring device including procedures for secure communication of data output from this device. The energy monitoring device includes a public/private key pair used to encrypt and/or digitally sign communications by the device. This allows the receivers of these communications to authenticate the communications to ensure that the device and/or communications have not been compromised. However, the using of the public/private key pair and/or digital signature is made according to a classical scheme which is nowadays well known by the person skilled in the art. Such a scheme does not optimize the communications exchanged between the energy monitoring device and the entity that bills for energy usage. This energy monitoring device is rather capable of communications via an ad-hoc "mesh" network for facilitating communications among devices which are substantially inaccessible due to either physical or economic limitations.

The document US 2011/0224935 relates to a measurement device, in particular energy counter for the safe detection and displaying of the count data and to a method for recognition of manipulations. It refers to the need that values that are taken and shown in the invoice should be beyond doubt for the consumer protection. These values are taken locally, are digitized and are transferred to a central office to be processed. The aim suggested by this document is to design a measurement device featuring data communication to at least one system in such a way that allows the system to identify the measurement data sent back as its own data, including a data manipulation check. To this end, the device has the capability of receiving signed and or encrypted measurement data, storing said measurement data in a memory in view for delivering back, and has the capability of offering time information related to a time reference.

The document US 2006/0206433 suggests that digital signatures are applied to metered energy data that is collected by a common data collection system. The system receives data from meters (each belonging to a certain customer) that may be owned by one or more utilities. The data sent by each meter is previously encrypted and signed. After receiving the data by the common data collection system, the data is stored by this system using public key cryptography to ensure that it is only accessible by the intended consumer of the data. When the data is transmitted to the intended consumer, it is digitally signed by the system to ensure the authenticity of the data as received by the consumer. The use of encryption and digital signatures allows the system to assure the integrity of the collected data even after the data has been communicated from the system (i.e., been published externally). However, to collect all the data metered by million of meters, the common data collection system has to be provided with huge data bases on the one hand, and these data bases must be connected to a very powerful data management system (computers) for quickly dealing the data in an efficient manner.

There is therefore a need for a communication system and method that further optimizes handling of data, in particular the upstream messages overload between a utility usage monitoring device (utility meter) and at least one utility management device or center.

SUMMARY OF THE INVENTION

The present invention relates to a utility meter for metering at least one utility consumption comprising:

- a metering unit for metering at least one utility consumption value V,
- a communication unit for sending/receiving messages to/from at least one remote management center assigned to the utility meter for processing the utility consumption value V by the remote management center,
- a memory to store a unique identifier ID pertaining to the utility meter and a first key K1 for encrypting messages to be sent by the communication unit,
- an encryption unit for encrypting the utility consumption value V as a first cryptogram C1,
- a message generator for generating a utility message containing said first cryptogram C1 to be sent to the remote management center,
- a key generator for generating a payload key Kp to be used by the encryption unit for encrypting the utility consumption value V,
- a second cryptogram C2 generated by the encryption unit by encrypting the payload key Kp with the first key K1, the second cryptogram C2 being intended to be included, by the message generator, at least once into one of said messages to be sent to the remote management center.

Preferably, the second cryptogram C2 is included with the first cryptogram C1 in the same utility message as that comprising the first cryptogram C1. Thus, first and second cryptograms may be sent either into the same message or into two separated messages.

According to the present invention the use of a payload key for encrypting, according to a symmetric encryption scheme, utility consumption values V that have to be frequently reported by each utility meters as upstream messages to a remote utility management center, allows to optimize the traffic of messages exchanged between these entities. In this way, each upstream message can be advantageously split into a shared payload message and a dedicated control message. Therefore, the same encrypted utility message can be sent, as utility reporting message, to a plurality of remote management centers which can share this message thanks to its encryption by one shared payload key. This can be particularly advantageous in case this utility message is broadcasted by the utility meter. The present invention also suggests various embodiments for generating the payload key. In one embodiment, the utility usage monitoring device pre-processes the payload key generation and shared payload encryption operations at the time of storing payload data into said device registers, and communicates the shared payload messages to the remote utility management center at a later time.

The present invention also relates to a method for managing a communication between a utility meter, used for metering at least one utility consumption, and at least one remote utility management center in charge of processing at least a part of the utility consumption. This communication network is supervised by at least one supervision center acting as a trusted entity in the communications, in particularly during an initialization phase of these communications. To this end, the utility meter of the present method comprises:

- a metering unit for metering at least one utility consumption value V,
- a communication unit for sending/receiving messages to/from at least the remote utility management center, a memory to store a unique identifier ID pertaining to the utility meter and a first key K1 required for the encryption/decryption of messages to be sent/received by the communication unit, an encryption unit for encrypting the utility consumption value V as a first cryptogram C1, a message generator for generating a utility message containing the first cryptogram C1 to be sent to the remote utility management center.

The method comprising the steps of:

requesting to the supervision center by the remote utility management center, the allocating of this remote utility management center with a specific utility meter by means of a request comprising at least the unique identifier ID of the utility meter, transmitting by the supervision center a key data to the remote utility management center; the key data being requested for the decryption/encryption of the messages, reading, by the utility meter, the utility consumption value V metered by the metering unit, generating, by the utility meter, the utility message comprising the first cryptogram C1, sending, by the utility meter, the utility message to the remote utility management center in view of it processing by this remote utility management center.

Other embodiments relating to the present method will be described in the following detailed description.

DETAILED DESCRIPTION

Figure 1:
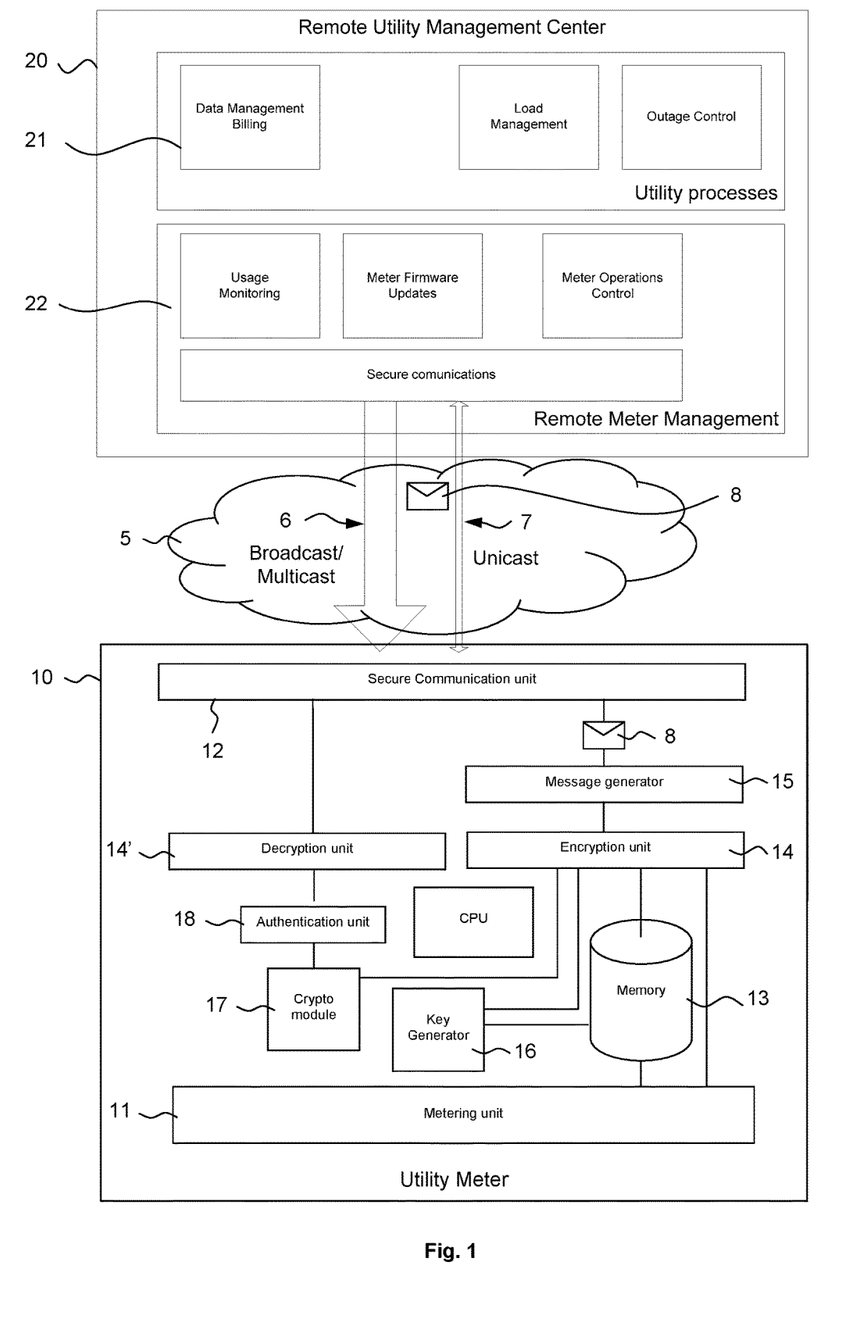
FIG. 1 shows a block diagram of a remote utility management center connected to a utility usage monitoring meter by a communication network supporting both unidirectional broadcast or multicast messaging and bidirectional unicast messaging.

In the proposed system the remote utility management center 20 from FIG. 1 implements various utility management processes 21 such as data management billing, load management and outage control, in collaboration with the remote meter management system.

The remote meter management system 22 from FIG. 1 itself comprises functional components in charge with enforcing meter usage monitoring, meter firmware updates and meter operations control by means of secure communications 6, 7 with the individual meters 10 through the communication network 5.

The communication network 5 from FIG. 1 may be any utility metering communication physical network, such as, but not limited to, a cable network, the power line wire, or a wireless network, supporting any communication networking protocol, such as, but not limited to, Internet Protocol (IP) v4 or v6. The secure communications handlers from FIG. 1 both on the remote utility management center side and the individual utility meter side further need to comply with a common messaging specification. That specification may be private when the remote utility meter management system and the utility meters 10 are all provided by the same meter manufacturer. However, as the utility market deregulates, there is increasing need in standardizing this communication interface so that various utility vendors and various meter manufacturers can provide interoperable systems and equipment complying to common, standard specifications. Hybrid messaging protocols are another alternative where standard messaging driving the basic metering functionality is combined with advanced private messaging extensions. The private approach, either full or hybrid, is of particular relevance to ensure security monitoring, maintenance and renewability over time as any standard specifications, once published, have to be enforced as specified for the standard lifetime and therefore cannot provide any upgrade flexibility in case of a breach in the security specification without revisiting the standard itself. Examples of utility meter data networking standard specifications include the DLMS series IEC62056 in combination with the COSEM companion specifications or ANSI C12.22 in combination with the ANSI C12.19 industry standard for end device data tables.

The utility meter 10 from FIG. 1 comprises a metering unit 11 which is provided with at least a main counter for metering at least one utility consumption value V referring to a utility consumption such as electrical power [kWh] or gas or water [m3]. It also comprises a communication unit 12 for sending/receiving messages 8 (i.e reporting messages or status messages) to/from at least one remote utility management center which is assigned to the utility meter. In many cases, such a utility meter will be associated to only one remote utility management center, typically a utility provider and/or a billing entity, which processes the consumption value V in view of billing. However, due to the on-going deregulation in worldwide energy distribution markets, the utility meter can also be associated to more than one remote utility management center, either for dealing different utility consumptions (e.g. gas and electricity), or for processing one or several utility consumptions according to different time slots or on specific days of the week. The utility meter further comprises a memory 13 to store any kind of data, in particular a unique identifier ID pertaining to the utility meter and a first key K1 for encrypting messages 8 to be sent by the communication unit 12. The utility consumption value V can be also stored in this memory, in particular for a limited duration during which its processing can be performed, typically when its processing is deferred with respect to its entering by the metering unit. The utility meter 10 also comprises an encryption unit 14 for encrypting messages or data to be sent out of the utility meter, in particular for encrypting the utility consumption value V as a first cryptogram C1, taking into account that a cryptogram is a ciphered text or a ciphered value. The utility meter 10 also comprises a message generator 15 for generating messages 8 such as a utility message containing the first cryptogram C1 to be sent to the remote utility management center 20. A processor CPU, which is in charge of managing all the functions and the components of the utility meter, is schematically illustrated in the center area of the utility meter 10 of FIG. 1. Typically, the processor CPU is in charge of managing the security of communications performed with the utility meter through the network 5 on the one hand, and is in charge of managing local utility meter operations on the other hand.

According to the present invention, the utility meter 10 further comprises a key generator 16 for generating a payload key Kp. This payload key Kp will be used by the encryption unit for encrypting the utility consumption value V, generating the first cryptogram C1. This result can be noted $C1=(V)_{Kp}$. A second cryptogram C2 is generated by the encryption unit 14. This second cryptogram C2 results from the encryption of the payload key Kp with the first key K1 and can be noted $C2=(Kp)_{K1}$. This second cryptogram C2 is intended to be included, by the message generator 15, into a message 8 to be sent to the remote utility management center 20. Preferably, this second cryptogram will be included at least once into to such a message, for instance at least during an initialization phase where the utility meter 10 is assigned to the remote utility management center 20. More preferably, this second cryptogram C2 will be periodically included into the message 8, at least each time the payload key Kp is changed or renewed.

Figure 2:
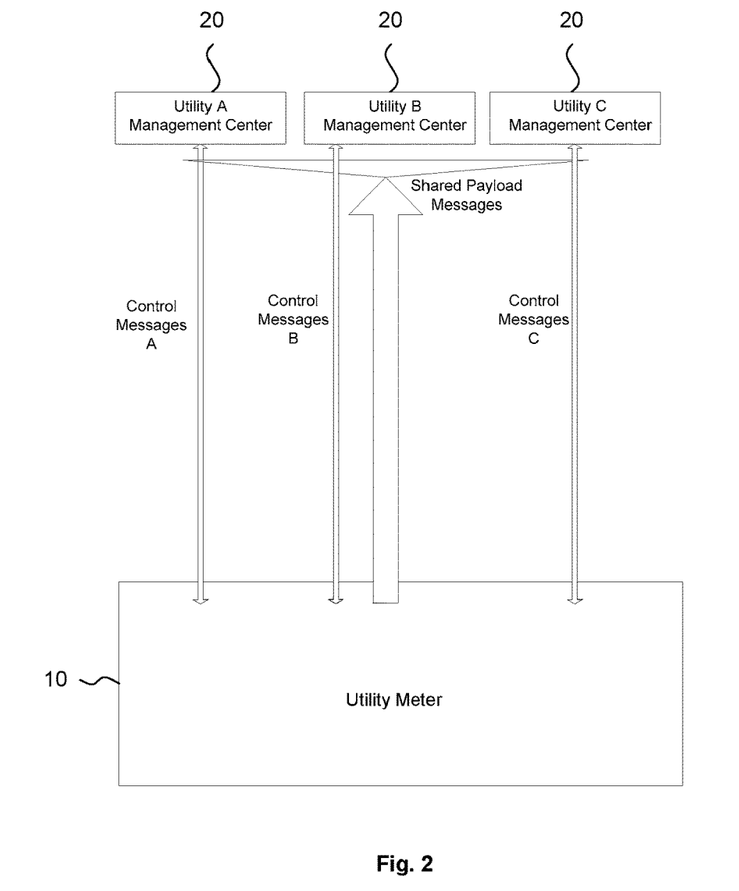
FIG. 2 shows a block diagram of several remote utility management centers connected to the same utility usage monitoring meter by one or more communication networks where the upstream messaging from the meter to the utility management center is split into dedicated control messages and shared payload messages.

FIG. 2 illustrates, by means of a block diagram, the solution suggested by the invention for optimizing the upstream messaging overload in a communication system between a utility usage monitoring device 10 and at least one remote utility management center 20. In particular, this Figure shows that upstream messages are advantageously split into shared payload messages and dedicated control messages. Payload messages can therefore be shared by several remote utility management centers 20 (denoted for example A, B, C in this Fig.) through the communication network 5. Thus, all the remote utility management centers can receive the same messages, e.g. simultaneously.

In this case, the utility meter 10 generates:
shared payload messages that can be unicast, multicast or broadcast to the attention of A, B and C management centers;
control messages A that are dedicated to and unicast to utility management center A;
control messages B that are dedicated to and unicast to utility management center B;
control messages C that are dedicated and unicast to utility management center C.

As described above, the utility meter generates a payload key Kp, encrypts at least one shared payload (typically the utility consumption value V) by means of the payload key Kp to get the first cryptogram C1, encrypts this payload key Kp to get the second cryptogram C2, transmits this first cryptogram C1 into at least one shared payload message 8, and transmits the second cryptogram C2 in at least one control message 8 to at least one remote utility management center 20. The encryption of the payload key Kp can be performed by using the first key K1 stored in the memory 13 of the utility meter.

In one embodiment, the first key K1, stored in the memory 13 is a so-called management center key, in particular the public key pertaining to the remote utility management center 20. This key can be used for encrypting messages 8 that have to be sent to the remote utility management center 20.

In another embodiment, for further messaging load balancing purposes, the time of upstream communication by a utility meter to the remote utility management center is scheduled by the utility meter according to programming instructions received from the remote utility management center, or triggered by certain events at the utility meter as pre-programmed into said device firmware, or directly triggered by request messages received from the remote utility management center through the communication network.

Figure 3:
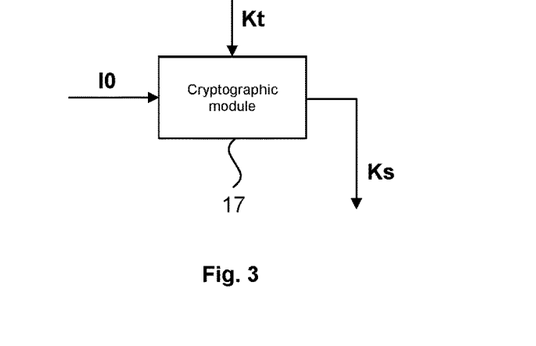
FIG. 3 depicts a block diagram showing the processing of an initialization value by a cryptographic module initialized by a secret key to generate as a result a shared key.

In another embodiment, the utility meter 10 comprises a secret key Kt (i.e. a personal key pertaining to this utility meter 10) which can be stored in the memory 13 or in another storage means, preferably in a secured area. According to this embodiment, the memory 13 also comprises an initialization value I0 which can be preferably received by the utility meter 10 within an initialization message. This utility meter 10 is also provided with a cryptographic module 17 as illustrated in FIG. 1. This cryptographic module integrates a function for generating a shared key Ks by taking the secret key Kt as a first input and the initialization value I0 as a second input, as shown in FIG. 3. The shared key Ks can be regarded as a kind of session key having a longer life.

In a further embodiment, the utility meter 10 preferably comprises a decryption unit 14' for decrypting messages received by the communication unit 12. The decryption unit and the encryption unit can be part of the same unit, namely an encryption/decryption unit. Thanks to the decryption unit 14', the utility meter can receive encrypted messages, such as encrypted control messages, from all the remote utility management center 20 to which it is assigned. Within a symmetric encryption scheme, these control messages could be encrypted by the shared key Ks, whereas within an asymmetric encryption scheme, these control messages are be encrypted with a private key pertaining to the remote utility management center and can be decrypted by the utility meter by using the public key of the remote utility management center 20 which has been previously stored in the memory 13 of the utility meter.

According to a further embodiment, the initialization message comprising the initialization value I0 is encrypted with an initialization session key Ki. This initialization session key Ki is stored in the memory 13 of the utility meter and is used by the decryption unit 14' for decrypting the initialization message when it is received by the communication unit 12.

In a further embodiment, the initialization message comprises a signature S for its authentication. Therefore, the utility meter 10 comprises an authentication unit 18 for verifying the authentication of the signature S. This authentication unit allows the loading of the initialization value I0 into the cryptographic module 17 only upon successful authentication. Thus, the generation of the shared key Ks cannot be tampered by introducing a fake initialization value I0 into the cryptographic module 17 upon receipt of a hacked initialization message.

Figure 4:
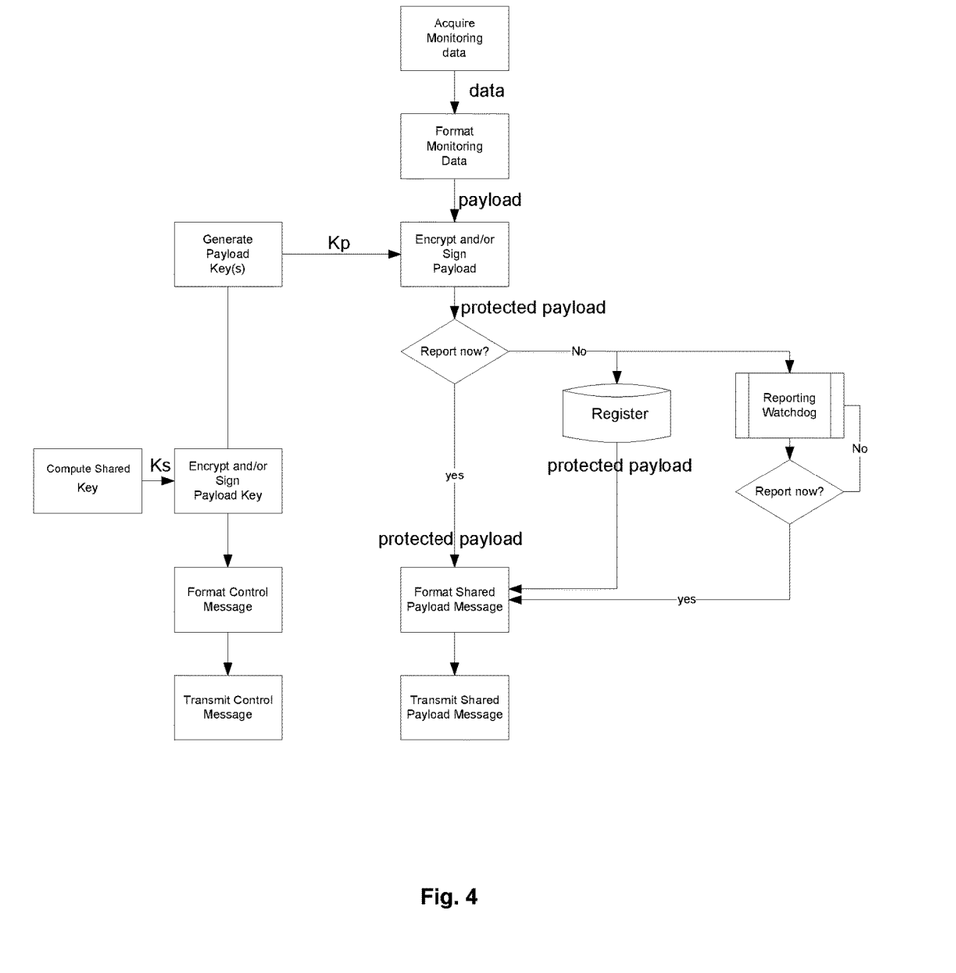
FIG. 4 depicts the flow chart of a utility usage monitoring device operation in accordance with one embodiment of the present invention.

The flowchart of FIG. 4 illustrates an example implementation of one embodiment where the following operations are executed:
The utility meter 10 acquires monitoring data to be reported to the utility management center 20. Such monitoring data may comprise for example usage monitoring information, payment information, meter operation event log, security monitoring information.
The utility meter formats the monitoring data into a payload message in accordance with standard specifications such as ANSI C12.19 data tables or IEC 62056/COSEM. Alternately, the payload format may be defined in a private specification, but it is preferably in a format that is understandable by all connected utility management centers A, B and C. In certain applications, a mix of standard and private format specification may be used too.

The utility meter 10 generates a payload key Kp, encrypts it and transmits it as Control Information (or control message) to the utility management center 20 in accordance with the secure communication protocols in place between the utility management center and the utility monitoring device. Preferably, this secure communication uses point-to-point shared secrets such as a secure authenticated channel session Ks jointly computed by the targeted utility management center and the utility monitoring device. Such point-to-point security protocols are defined for instance in the ANSI C12.22 or IEC 62056/COSEM standard specifications. The generation, encryption and transmission process of the payload key Kp may be executed synchronously or asynchronously with the payload formatting operation, but preferably in an asynchronous mode. In particular it is possible to generate the payload key Kp only once in a while so as to decrease the necessary unicast control messages needed to transmit this shared payload key Ks individually to each utility management center A, B and C. This way of doing also contributes to the optimization of upstream communications.

The utility meter protects the monitoring of payload data by means of the payload key Kp. Depending on the threat models and chosen standard or private cryptography protocols, this protection operation may comprise one or more steps of encryption and/or hashing and/or signing payload data chunks using the payload key Kp, for instance in accordance with the ANSI C12.22 or IEC 62056/COSEM security specifications. Preferably, a simple efficient state-of-the-art cipher such as AES with a 128 bit payload key Kp is used. Alternately, the payload key Kp may also be combined with other private and/or public keys and/or seed values, which may be stored into the monitoring device at manufacturing time, locally generated by the monitoring device, or previously transmitted from the utility management center either directly or as part of a monitoring device firmware upgrade by any remote or local communication means. In specific cases, custom cryptography algorithms may be applied, in particular when handling sensitive security monitoring data.

At the time of communicating back to the remote utility management center, in the example implementation of FIG. 4, the utility meter 10 formats the shared payload message 8 and transmits it to the utility management centers 20 in unicast, multicast or broadcast mode.

As illustrated in FIG. 4, the shared payload data processing and protection operations may be executed in advance to the transmission time. In that case, the protected shared payload data is stored in a memory buffer or register of the utility meter. At the time of transmission, the utility meter reads the protected shared payload data from the register in order to format and transmit the shared payload message 8 to the target remote utility management center 20. Proceeding this way saves computing power and memory on the utility meter as payload protection by means of cryptographic algorithms needs to be done only once and can be done in advance. Moreover, the transmission to each remote utility management center A, B or C can take place at a different time.

Figure 5:
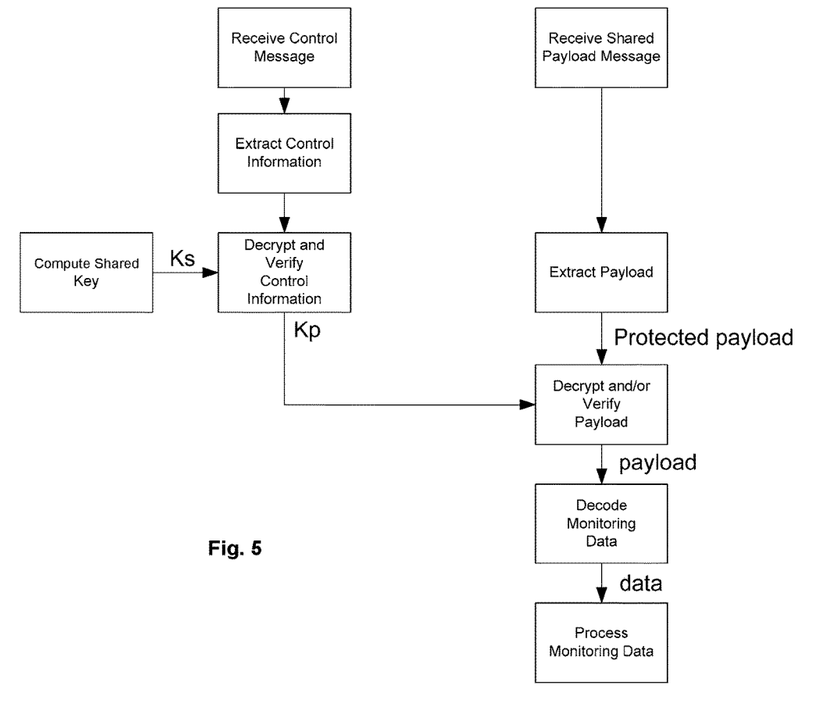
FIG. 5 depicts the flow chart of the utility management center operation in accordance with one embodiment of the present invention.

FIG. 5 illustrates the reverse operations taking place at the remote utility management center that will now be described:

The remote utility management center 20 receives a control message 8, and extracts the Control Information from this control message.

The remote utility management center decrypts and verifies the Control Information to derive the payload key Kp in accordance with the secure communication protocols in place between the utility management center and the utility monitoring device. Preferably, this secure communication uses point-to-point shared secrets such as a secure authenticated channel shared key Ks jointly computed by the utility management center and the utility monitoring device. Such point-to-point security protocols are defined for instance in the ANSI C12.22 or IEC 62056/COSEM standard specifications.

The utility management center receives a shared payload message 8, and extracts the protected payload from this shared payload message.

The utility management center derives the clear payload from the protected payload by means of the formerly computed payload key Kp. This operation may comprise one or more steps of decryption and/or verification of the protected payload data chunks using the payload key Kp, in accordance with the protection method applied by the utility monitoring device.

Further variants to the system and method represented by FIG. 4 and FIG. 5 are also possible.

For instance the encryption and message formatting operations may be executed in a different order by the utility meter 10.

The payload message 8 may also be pre-processed and stored in memory buffers 13 or registers by the utility meter.

The utility meter 10 and the remote utility management center 20 may exchange further messages 8 to synchronize the control messages exchanges or the shared key Ks update.

Beyond the purely functional monitoring payload messages, a number of messages need to be sent upstream by the utility meter to the remote utility management center, in particular in the case of security credentials and security firmware updates require a secure reception and execution acknowledge message back to the utility initiating the upgrade. For practical reasons, the upgrade messages may be broadcast or multicast downstream meaning all targeted utility meters 10 will receive and handle them at the same time, and consequently send the acknowledge messages back upstream at the same time, thus resulting in a possible congestion of the network traffic and peak processing scalability issues at the remote utility management center.

In order to better balance the upstream load between the multiple connected utility meters 10, the utility meter register buffering can be programmed to last more or less long depending on certain parameters such as the utility meter unique identifier ID (serial number), the utility meter firmware version number, the utility meter utility rate subscription or consumption information, or an explicit command to be sent individually to the utility meter by the utility in a unicast downstream message.

It is also possible to embed the explicit commands into the firmware upgrade broadcast or multicast messages, in particular if the smart metering messaging protocol enables to define target groups of utility meters: each group may then share an explicit command, and the firmware upgrade payload will be appended with a concatenation of explicit commands, one for each target group. In that scenario, ideally the utility vendor will define the group membership based on geographical/localization information if available, so that the upstream load is also balanced at local grid level.

The utility meter could also comprise a validity unit 19 (FIG. 1) for dealing with renewal messages sent by the remote utility management center. Alternately, the validity unit 19 could be used for checking the validity of a time stamp T included into an incoming message (e.g. an initialization message, a control message or any data message) sent by the remote utility management center or any other center.

The utility meter could also comprise a transmission control unit in charge of verifying e.g. if an acknowledgement message has been duly received from the remote management center in response to a reporting message. In the positive event, the transmission control unit delivers a positive signal, whereas upon negative event it can deliver a negative signal.

The utility meter could also comprise a validity counter for incrementing or decrementing a validity value, and a switch for switching the operating of the utility meter from a normal operating mode (standard mode) to a disrupted operating mode.

Figure 6A:
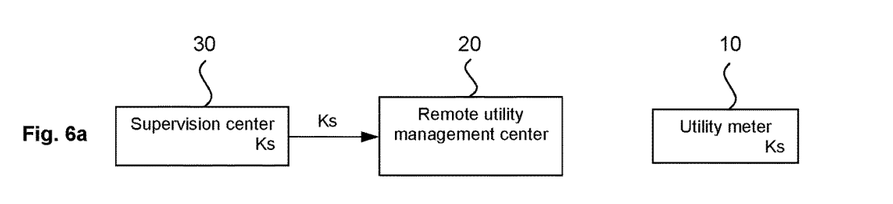
FIGS. 6a, 6b and 6c show several variants of a utility system comprising a supervision center as a third entity, in addition to the utility meter and the remote utility management center.
Figure 6B:
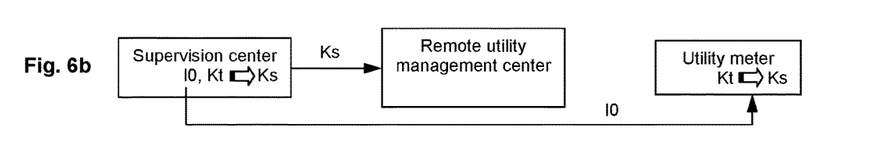
Figure 6C:
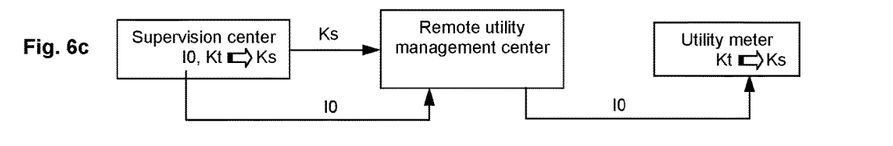

As the secret key Kt of the utility meter 10 must remain secret and is a priori unknown from the remote utility management centers 20 (utility providers), the present invention also suggests the implementation of a method involving a third remote entity, named as supervision center 30, as schematically shown in FIGS. 6a, 6b and 6c. The aim of this method is to manage a communication between a utility meter 10, used for metering at least one utility consumption, and at least one remote utility management center 20 in charge of processing at least a part of this utility consumption; this communication being supervised by at least one supervision center 30, for instance through the same the communication network 5 as that used between the utility meter 10 and the remote utility management center 20. To this end and as already shown in FIG. 1, the utility meter comprises:

- a metering unit 11 for metering at least one utility consumption value V,
- a communication unit 12 for sending/receiving messages 8 to/from at least the remote utility management center 20, taking into account that it may also receive messages from the supervision center 30 (FIG. 6b),
- a memory 13 to store a unique identifier ID pertaining to the utility meter 10 and a first key K1 required for the encryption/decryption of messages 8 that have to be sent/received by the communication unit 12,
- an encryption unit 14 for encrypting said utility consumption value V as a first cryptogram C1 in particular the first cryptogram C1 will result from the encryption of the utility consumption value V by the first key K1,
- a message generator 16 for generating a utility message 8 containing said first cryptogram C1 that has to be sent to the remote utility management center 20.

This method comprises the steps of:

- requesting to the supervision center 30 by the remote utility management center 20, the allocating (i.e the association) of this remote utility management center 20 with a specific utility meter 10 by means of a request (e.g. a message) comprising at least the unique identifier ID of said utility meter 10; this request can be regarded as an enrolling request sent by the utility meter to at least one remote utility management center of its choice; then the remote utility management center 20 contacts the supervision center 30 (e.g. by forwarding the request) in view of realizing this request,
- transmitting by the supervision center 30 a so-called key data (i.e. data relating to a key) to the remote utility management center 20; said key data being requested for the decryption/encryption of messages 8,
- reading, by the utility meter 10, the utility consumption value V metered by the metering unit 11,
- generating, by the utility meter 10, the utility message 8 including the first cryptogram C1,
- sending, by the utility meter 10, the utility message 8 to the remote utility management center 20 in view of it processing by this remote utility management center.

According to one possible way, the supervision center 30 could belong to the manufacturer of the utility meters. Advantageously in this case, it already knows personal data of the utility meter, in particular the unique identifier ID and the private key Kt of each utility meter 10. Alternately, the supervision center can be any third authority which is independent from any remote utility management centers and which is entitled to deal with the secret key Kt of utility meters.

Alternatively, the request sent to the supervision center 30, in view to register the association of a remote utility management center 20 with a particular utility meter 10, could be also done by the utility meter instead of the remote utility management center. In this case, this request should further comprise the unique identifier of this remote utility management center 20.

According to one embodiment, the key data transmitted by the supervision center 30 to the remote utility management center 20 is the first key K1 which is already stored in the memory 13 of the utility meter 10 and which is used as shared key Ks. This embodiment is depicted in the FIG. 6a. Since all entities 10, 20, 30 have the shared key Ks, therefore they can communicate with each other under safe conditions.

The FIG. 6b shows an alternate embodiment in which the first key K1, stored in the memory 13, is a secret key Kt pertaining to the utility meter 10. According to this embodiment, the secret key Kt is also known by the supervision center keeping this key as confidential data due to its trusted entity status. To this end, the supervision center is provided with a secured database comprising, for each utility meter of the system, a record including at least its unique identifier ID together with its secret key Kt. Preferably, each record further comprises the unique identifier of the remote utility management center and, optionally, the current shared key Ks. In this embodiment, both the supervision center 30 and the utility meter 10 comprise each a cryptographic module 17 as shown in FIG. 3. Thus they are each able to generate a shared key Ks by taking the secret key Kt as a first input and an initialization value I0 as a second input. To this end, the required initialization value I0 is generated (e.g. randomly) by the supervision center 30 and the key data (mentioned above) is the shared key Ks provided by the cryptographic module 17 of the supervision center. The method further comprises the steps of:

- generating the shared key Ks by the supervision center 30 using its cryptographic module 17,
- transmitting the initialization value I0, from the supervision center 30 to the utility meter 10, within an initialization message,
- loading the initialization value I0 and the secret key Kt into the cryptographic module of the utility meter, in order to obtain the required shared key Ks that has to be used for the encryption/decryption of messages according a symmetric encryption scheme, when exchanging communications between the utility meter 10 and the remote utility management center 20.

Once calculated by the utility meter, the shared key Ks can be stored in the memory 13 of the utility meter. Alternately, the initialization value I0 can be stored in this memory instead of the shared key KS which can be calculated each time a messages must be encrypted/decrypted.

By this way, any disclosure of the secret key Kt of the utility meter is avoided. When, a new owner of a utility meter wants the services provided by a remote utility management center of his choice, the remote utility management center sends a request for registration to the supervision center. Then, this supervision center will update its database by recording a new pairing between the utility meter 10 of this new client and this remote utility management center.

The illustration of FIG. 6c suggests a variant of the embodiment of FIG. 6b. As shown in FIG. 6c, the transmitting step of the initialization value I0 is performed, from the supervision center 30, through the remote utility management center 20 which forwards the initialization message to the utility meter 10. The initialization value I0 and the shared key Ks can be transmitted by the supervision center in two separate messages or in a single message, for instance as key data.

According to another embodiment, the initialization message further comprises a signature S, typically a hash value which can be obtained by applying a hash function onto the initialization message. This signature S can be performed, during a so-called signature step, by the supervision center 30 using a signature unit. As a result, the method also comprise an authentication step performed by the utility meter for verifying the authentication of this signature S. This check can be achieved by an authentication unit 18 (FIG. 1). In case of successful authentication, the loading of the initialization value (10) into its cryptographic module is allowed.

In another embodiment, the method further comprises a first validity step, which is performed by the supervision center to add a time stamp T (i.e. a validity data) to the initialization message. This time stamp T is defined by the supervision center 30 on the basis of a current time CT. In this embodiment, the method comprises a second validity step which is performed by the utility meter 10 before loading the initialization value I0 into its cryptographic module 17. The second validity step aims to check the validity of the time stamp T, by comparing it with the current time CT. In case of successful validation, the loading of the initialization value I0 is allowed.

For instance, the time stamp T is a validity date, a validity time or a validity time interval defined e.g. by two dates, one starting date and one end date. According to a first way, the both the supervision center 30 and the utility meter 10 comprise each a timer (e.g. a clock) producing a current time CT and the so-called second validity step aims to verify that the current time CT is within a validity period determined from said validity data T. The two timers have to be synchronized as much as possible. According to an alternate way, the current time CT can be provided by a single radio controlled signal which can be received by each timer.

In a further embodiment, the utility meter 10 comprises a key generator 16 for generating a payload key Kp that has to be used by its encryption unit 14 for encrypting the utility consumption value V within a payload message 8. In this embodiment, the method further comprises the steps of:

generating a payload key Kp, using this payload key Kp for encrypting the utility consumption value V as a result of the first cryptogram C1, generating a second cryptogram C2 as a result of the encryption of the payload key Kp by the first key K1 by using the encryption unit 14 of the utility meter 10, including the second cryptogram C2 into a utility message 8 before sending it to the remote utility management center 20. Preferably, the second cryptogram C2 is sent together with the first cryptogram C1, in the same message However, first and second cryptograms can be also sent into two separated messages. Preferably, this second cryptogram will be included at least once into to such a message, for instance at least during an initialization phase where the utility meter 10 is assigned to the remote utility management center 20. More preferably, this second cryptogram C2 will be periodically included into the message 8, at least each time the payload key Kp is changed or renewed.

According to another embodiment the first key K1 of the present method is a so-called remote management key Km pertaining to the remote utility management center.

According to a further embodiment of the invention, the utility meter 10 could be monitored and managed by more than one remote utility management centers 20. Such a situation might occur if the utility meter would able to meter different kinds of utility at the same time, e.g. monitoring simultaneously electric power and water consumptions. Therefore, the system shown in FIG. 6a, 6b, 6c is obviously not limited to only one utility meter. The same applies to the remote utility management center 20 and even to the supervision center 30. Alternately, the utility meter 10 could be able to work in accordance with a time scheduler, so that providing of electric power, gas or water could be carried out for some parts of time by a first remote utility management center and for other parts of time by another provider.

In the above description, the terminology which refers to the utility usage monitoring device qualifies either a utility meter 10, as illustrated in FIG. 1, or a home appliance device that can be remotely monitored and managed from the remote utility management centre 20 (as shown in FIG. 1) or from a collector concentrator equipment. Moreover, the terminology which refers to the remote utility management center is used to qualify either a central utility provider management center or an intermediate collector concentrator equipment node in the smart grid network, where the utility management center is under close control by the utility provider, for instance in a secure room or building.

The invention claimed is:
1. A device comprising:
a data collection module configured to collect device data; and
a communication circuit configured to exchange encrypted messages with a plurality of remote utility management centers, the encrypted messages including downstream messages received from the plurality of remote utility management centers and upstream messages transmitted to plurality of the remote utility management centers,
the device being configured to
encrypt the device data with a payload key,
generate a payload message comprising the encrypted device data,
transmit the payload message to the plurality of the remote utility management centers, encrypt the payload key with a first key specific to a single one of the plurality of remote utility management centers, generate a control message comprising the encrypted payload key, and transmit the control message to the single one of the plurality of remote utility management centers.

2. The device of claim 1, wherein the first key is a management center public key pertaining to the single one of the plurality of remote utility management centers.

3. The device of claim 1, wherein the first key is derived from an initialization value and a secret key known by the device, the initialization value being received through an initialization message.

4. The device of claim 3, wherein the initialization message further comprises a signature for authenticating the initialization message and allowing a use of the initialization value in case of successful authentication.

5. The device of claim 3, wherein the initialization message further comprises a time stamp for checking the validity of the initialization message and allowing a use of the initialization value in case of successful validity.

6. The device of claim 1, wherein the device data comprise at least utility consumption values metered by a utility meter.

7. The device of claim 1, wherein the device is further configured to transmit the upstream messages according to a time basis defined by a command received by at least one of the plurality of remote utility management centers or a parameter from which the device is identifiable.

8. The device of claim 1, wherein the device is a utility meter or a part of the utility meter.

9. A method for exchanging encrypted messages between a device configured to collect device data, and a plurality of remote utility management centers configured to process the device data, the encrypted messages including downstream messages received from the plurality of remote utility management centers and upstream messages transmitted to the plurality of remote utility management centers, the method comprising:

encrypting the device data with a payload key;

generating a payload message comprising the encrypted device data;

transmitting the payload message to the plurality of the remote utility management centers;

encrypting the payload key with a first key specific to a single one of the plurality of remote utility management centers;

generating a control message comprising the encrypted payload key; and transmitting the control message to the single one of the plurality of remote utility management centers.

10. The method of claim 9, wherein the first key is a management center public key pertaining to the single one of the plurality of remote utility management centers.

11. The method of claim 9, wherein the first key is derived from an initialization value and a secret key known by the device, the initialization value being received through an initialization message.

12. The method of claim 11, wherein the initialization message is emitted by a supervision center linked to the plurality of remote utility management centers to which the control message is transmittable.

13. The method of claim 11, further comprising receiving the initialization message by the device via one of the plurality of remote utility management centers.

14. The method of claim 11, wherein the initialization message further comprises a signature for authenticating the initialization message and allowing a use of the initialization value in case of successful authentication.

15. The method of claim 11, wherein the initialization message further comprises a time stamp for checking the validity of the initialization message and allowing a use of the initialization value in case of successful validity.

16. The method of claim 11, wherein the first key, derived from the initialization value and the secret key, is a symmetric session key.

17. The method of claim 11, wherein the initialization value received through the initialization message is encrypted using a symmetric initialization session key.

18. The method of claim 9, further comprising transmitting, by the device, the upstream messages according to a time basis defined by a command received by at least one of the plurality of remote utility management centers or a parameter from which the device is identifiable.

19. A device comprising:
circuitry configured to
collect device data, and
exchange encrypted messages with a plurality of remote utility management centers, the encrypted messages including downstream messages received from the plurality of remote utility management centers and upstream messages transmitted to plurality of the remote utility management centers, wherein the circuitry is further configured to
encrypt the device data with a payload key,
generate a payload message comprising the encrypted device data,
transmit the payload message to the plurality of the remote utility management centers,
encrypt the payload key with a first key specific to a single one of the plurality of remote utility management centers,
generate a control message comprising the encrypted payload key, and
transmit the control message to the single one of the plurality of remote utility management centers.

\* \* \* \* \*